(12) United States Patent
Schönherr et al.

(10) Patent No.: US 8,096,484 B2
(45) Date of Patent: Jan. 17, 2012

(54) METHOD FOR THE PRODUCTION OF DRY FREE-FLOWING HYDROPHOBIN PREPARATIONS

(75) Inventors: Michael Schönherr, Frankenthal (DE);
Tillman Faust, Weisenheim (DE);
Ulrike Richter, Jersey City, NJ (US);
Thomas Subkowski, Ladenburg (DE);
Marvin Karos, Schwetzingen (DE)

(73) Assignee: BASF SE (DE)

( * ) Notice: Subject to any disclaimer, the term of this patent is extended or adjusted under 35 U.S.C. 154(b) by 225 days.

(21) Appl. No.: 12/377,479

(22) PCT Filed: Aug. 6, 2007

(86) PCT No.: PCT/EP2007/058103
§ 371 (c)(1),
(2), (4) Date: Feb. 13, 2009

(87) PCT Pub. No.: WO2008/019965
PCT Pub. Date: Feb. 21, 2008

(65) Prior Publication Data
US 2010/0317833 A1 Dec. 16, 2010

(30) Foreign Application Priority Data
Aug. 15, 2006 (EP) .................... 06118947

(51) Int. Cl.
*A62C 5/02* (2006.01)
(52) U.S. Cl. .......................................... 239/9
(58) Field of Classification Search .................. 530/350; 427/372.2; 239/9
See application file for complete search history.

(56) References Cited

U.S. PATENT DOCUMENTS

| | | | |
|---|---|---|---|
| 2,399,161 | A | 4/1946 | Brother et al. |
| 3,431,062 | A | 3/1969 | Fox et al. |
| 3,431,064 | A | 3/1969 | Fox et al. |
| 3,458,274 | A | 7/1969 | Cashman et al. |
| 3,459,492 | A | 8/1969 | Cawley et al. |
| 3,549,313 | A | 12/1970 | Eckert et al. |
| 3,751,280 | A | 8/1973 | Nerurkar et al. |
| 4,129,706 | A | 12/1978 | Keppler et al. |
| 4,183,908 | A | 1/1980 | Rolfe |
| 4,241,191 | A | 12/1980 | Keppler et al. |
| 4,617,272 | A | 10/1986 | Kirkwood et al. |
| 5,015,677 | A | 5/1991 | Benedict et al. |
| 5,049,504 | A | 9/1991 | Maugh et al. |
| 5,110,835 | A | 5/1992 | Walter et al. |
| 5,246,677 | A | 9/1993 | Moser et al. |
| 5,290,819 | A | 3/1994 | Witt et al. |
| 5,318,903 | A | 6/1994 | Bewert et al. |
| 5,859,198 | A | 1/1999 | Haber |
| 6,440,325 | B1 | 8/2002 | Hartley et al. |
| 6,977,239 | B1 | 12/2005 | Weuthen et al. |
| 7,241,734 | B2 | 7/2007 | Sweigard et al. |
| 2003/0049726 | A1 | 3/2003 | Holloway et al. |
| 2003/0113454 | A1 | 6/2003 | de Vocht et al. |
| 2003/0134042 | A1 | 7/2003 | de Vocht et al. |
| 2003/0180704 | A1 | 9/2003 | Brockbank et al. |
| 2003/0217419 | A1 | 11/2003 | Vic |
| 2005/0179000 | A1 | 8/2005 | Sapienza et al. |
| 2006/0024417 | A1 | 2/2006 | Berry et al. |
| 2006/0040349 | A1 | 2/2006 | Sweigard et al. |
| 2007/0077619 | A1 | 4/2007 | Ostermann et al. |
| 2008/0319168 | A1 | 12/2008 | Subkowski et al. |
| 2009/0101167 | A1 | 4/2009 | Boeckh et al. |
| 2009/0104663 | A1 | 4/2009 | Subkowski et al. |
| 2009/0131281 | A1 | 5/2009 | Guzmann et al. |
| 2009/0136433 | A1 | 5/2009 | Subkowski et al. |
| 2009/0136996 | A1 | 5/2009 | Subkowski et al. |

FOREIGN PATENT DOCUMENTS

| | | |
|---|---|---|
| CA | 2602155 A1 | 10/2006 |
| DE | 26 09 104 A1 | 9/1977 |
| DE | 26 38 839 A1 | 3/1978 |
| DE | 3522494 A1 | 1/1987 |
| DE | 263790 A1 | 1/1989 |
| DE | 4119281 A1 | 12/1992 |
| DE | 42 20 225 A1 | 12/1993 |
| DE | 19942539 A1 | 3/2001 |
| DE | 10 2004 025 805 A1 | 12/2005 |
| DE | 10 2005 007 480 A1 | 9/2006 |
| EP | 0252561 A2 | 1/1988 |
| EP | 0470455 A2 | 2/1992 |
| EP | 0611824 A1 | 8/1994 |
| EP | 0662515 | 7/1995 |
| EP | 0773296 A1 | 5/1997 |
| EP | 0522269 B1 | 1/2000 |
| EP | 1010748 A1 | 6/2000 |
| EP | 1223219 | 7/2002 |
| EP | 1252516 B1 | 4/2004 |
| FR | 2833490 | 6/2003 |
| GB | 195876 A | 4/1923 |
| GB | 562561 | 7/1944 |
| GB | 2235457 A | 3/1991 |
| JP | 55032789 A | 3/1980 |
| JP | 60206893 | 10/1985 |
| JP | 06327481 | 11/1994 |

(Continued)

OTHER PUBLICATIONS

Ananichev, A. V., et al., "Immobilization of Glucose Isomerase by Adsorption on Porous Silochrome Under Vacuum", Prikladnaya Biokhimiya I Mikrobiologiya, 1984, vol. 20, No. 4, pp. 458-463.

Bauer J. A., et al., "Three-Dimensional Structure of YaaE from *Bacillus subtilis*, a Glutaminase Implicated in Pyridoxal-5'-Phosphate Biosynthesis", Journal of Biological Chemistry, 2004, vol. 279, No. 4, pp. 2704-2711.

Belitsky, B. R., "Physical and Enzymological Interaction of *Bacillus subtilis* Proetins Required for De Novo Pyridoxal 5' Phosphate Biosynthesis", Journal of Bacteriology, 2004, vol. 186, No. 4, pp. 1191-1196.

(Continued)

*Primary Examiner* — Maryam Monshipouri
(74) *Attorney, Agent, or Firm* — Connolly Bove Lodge & Hutz LLP

(57) ABSTRACT

Method for the production of dry, free-flowing, stable hydrophobin preparations by spraying and drying aqueous hydrophobin solutions, if appropriate comprising additives in a spray device.

6 Claims, 6 Drawing Sheets

FOREIGN PATENT DOCUMENTS

| | | |
|---|---|---|
| JP | 07289261 | 11/1995 |
| JP | 08266281 | 10/1996 |
| WO | WO-94/09094 A1 | 4/1994 |
| WO | WO-94/24413 A1 | 10/1994 |
| WO | WO-96/41882 A1 | 12/1996 |
| WO | WO-00/23039 A2 | 4/2000 |
| WO | WO-00/58342 A1 | 10/2000 |
| WO | WO-01/38476 A1 | 5/2001 |
| WO | WO-01/57066 A2 | 8/2001 |
| WO | WO-01/57076 A1 | 8/2001 |
| WO | WO-01/57528 A1 | 8/2001 |
| WO | WO-01/60916 | 8/2001 |
| WO | WO-02/20651 A2 | 3/2002 |
| WO | WO-02/46342 A2 | 6/2002 |
| WO | WO-02/46369 | 6/2002 |
| WO | WO-03/010331 A2 | 2/2003 |
| WO | WO-03/018673 A1 | 3/2003 |
| WO | WO-03/031500 A1 | 4/2003 |
| WO | WO-03/053383 A2 | 7/2003 |
| WO | WO-03/080137 A1 | 10/2003 |
| WO | WO-2004/000880 A1 | 12/2003 |
| WO | WO-2005/033316 A2 | 4/2005 |
| WO | WO-2005/068087 A2 | 7/2005 |
| WO | WO-2005/115306 A2 | 12/2005 |
| WO | WO-2006/082251 A2 | 8/2006 |
| WO | WO-2006/082253 A2 | 8/2006 |
| WO | WO-2006/103215 A1 | 10/2006 |
| WO | WO-2006/103225 A1 | 10/2006 |
| WO | WO-2006/103230 A1 | 10/2006 |
| WO | WO-2006/103251 A1 | 10/2006 |
| WO | WO-2006/103252 A2 | 10/2006 |
| WO | WO-2006/103253 A2 | 10/2006 |
| WO | WO-2006/128877 A1 | 12/2006 |
| WO | WO-2006/131555 A1 | 12/2006 |
| WO | WO-2006/131564 A2 | 12/2006 |
| WO | WO-2006/136607 A2 | 12/2006 |
| WO | WO-2007/006765 A1 | 1/2007 |
| WO | WO-2007/014897 A1 | 2/2007 |
| WO | WO-2007/042487 A2 | 4/2007 |

OTHER PUBLICATIONS

Bell-Pedersen, D., et al., "The *Neurospora* circadian clock-controlled gene, *ccg-2*, is allelic to *eas* and encodes a fungal hydrophobin required for formation of the conidial rodlet layer", Genes & Development, 1992, vol. 6, pp. 2382-2394.

Bertoldi G. A. Von, "Die Beeinflussung der Form- and Kristallgroesse von gefaelltem Calciumsulfatdihydrat sowie die Bedingungen der Dehydration". Zement-Kalk-Gips, 1978, No. 12, pp. 626-629.

Corvis, Y., et al., "Preparing Catalytic Surfaces for Sensing Applications by Immobilizing Enzymes via Hydrophobin Layers", Anal. Chem., 2005, vol. 77, pp. 1622-1630.

Database WPI, Derwent Publications, Ltd., AN1998-426189; RU 2102560 (1998).

De Vocht, M. L., et al., "Structural and Functional Role of the Disulfide Bridges in the Hydrophobin SC3", Journal of Biological Chemistry, 2000, vol. 275, No. 37, pp. 28428-28432.

Hamer, J. E., et al., "Infection-related development in the rice blast fungus *Magnaporthe grisea*", Curr. Opinion Microiol., 1998, vol. 1, pp. 693-697.

Hider, G. C., "A Relatively Simple Test for the Direct Determination of the Cysteine Content in Photographic Gelatin Using a Thiol-Specific Fluorogenic Reagent", The Imaging Science Journal, 1997, vol. 45, pp. 162-166.

Imai, Y., et al., "The Fission Yeast Mating Pheromone P-factor: its Molecular Structure, Gene Structure, and Ability to Induce Gene Expression and $G_1$ Arrest in the Mating Partner", Development, 1994, vol. 8, pp. 328-338.

International Search Report PCT/EP/2006/062735 dated Oct. 13, 2006.

International Search Report PCT/EP2008/060870 dated Jul. 13, 2009.

International Search Report PCT/EP2008/062677 dated Feb. 4, 2009.

International Search Report PCT/EP2009/051292 dated May 19, 2009.

Janssen, M. I., et al., Coating with Genetic Engineered Hydrophobin Promotes Growth of Fibroblasts on a Hydrophobic Solid, Biomaterials, 2002, vol. 23, pp. 4847-4854.

Linder, M., et al., "Surface Adhesion of Fusion Proteins Containing the Hydrophobins HFBI and HFBII from *Trichoderma reesei*", Protein Science, 2002, vol. 11, pp. 2257-2266.

Lugones, L. G., et al., "Hydrophobins line air channels in fruiting bodies of *Schizophyllum commune* and *Agaricus bisporus*:", Mycol. Res., 1999. vol. 103, No. 5, pp. 635-640.

Mullin, J. W., "Crystallization and Precipitation" Ullmann's Encyclopedia of Industrial Chemistry, 4.4 Crystal Habit Modification, 2005, vol, 7, pp. 1-51.

Nakari-Setälä, T., et al., "Expression of a Fungal Hydrophobin in the *Saccharomyces cerevisiae* Cell Wall: Effect on Cell Surface Properties and Immobilization", Applied and Environmental Microbiology, 2002, vol. 68, No. 7, pp. 3385-3391.

Osborne, D. W., et al., "Skin Penetration Enhancers Cited in the Technical Literature", Pharmaceutical Technology, (1997), pp. 58, 60, 62, 64, 66.

Scholtmeijer, K., et al., "Fungal Hydrophobins in Medical and Technical Applications", Applied Microbiology and Biotechnology, 2001, vol. 56, pp. 1-8.

Scholtmeijer, K., et al., "Surface Modifications Created by Using Engineered Hydrophobins", Applied and Environmental Microbiology, 2002, vol. 68, No. 3, pp. 1367-1373.

Stringer, M. A., et al., "dewA Encodes a Fungal Hydrophobin Component of the *Asoergillus* Spore Wall", Molecular Microbiology, 1995, vol. 16, No. 1, pp. 33-44.

Wirsching. F., "Calcium Sulfate". Ullmann's Encyclopedia of Industrial Chemistry, 3.2 Flue Gas Desulphurization (FDG) Gypsum, 2006, vol. 4, pp. 7-9.

Wösten, H. A. B., et al., "How a fungus escapes the water to grow into the air", Curr. Biol., 1999, vol. 19, pp. 85-88.

Wösten, H. A. B., et al., "Hydrophobins: Multipurpose Proteins", Annu. Rev. Microbiol., 2001, vol. 55, pp. 625-646.

Wösten, H.A.B., et al., "The Fungal Hydrophobin Sc3P Self-Assembles at the Surface of Aerial Hyphae as a Protein Membrane constituting the Hydrophobic Rodlet Layer", European journal of Cell biology, vol. 63, (1994), pp. 122-129.

Plank, C., et al.., "Application of Membrane-Active Peptides for Drug and Gene Delivery Across Cellular Membranes", Advanced Drug Delivery Reviews, vol. 34, (1998), pp. 21-35.

Williams, A.C., et al., "Penetration Enhancers", Advanced Drug Delivery Reviews, vol. 56, (2004), pp. 603-618.

Van Wetter et al., "SC3 and SC4 hydrophobins have distinct roles in formation of aerial structures in dikaryons of *Schizophyllum commune*", Molecular Microbioligy, vol. 36, pp. 201-210 (2000).

Claessen, et al., "A novel class of secreted hydrophobic proteins is involved in aerial hyphae formation in *Streptomyces coelicolor* by forming amyloid-like fibrils", Genes & Development, vol. 17, pp. 1714-1726 (2003).

Elliot et al., "The chaplins: a family of hydrophobic cell-surface proteins involved in aerial mycelium formation in *Streptomyces coelicolor*", Genes & Development, vol. 17, pp. 1727-1740 (2003).

Kershaw et al., "Hydrophobins and Repellents: Proteins with Fundamental Roles in Fungal Morphogenesis", *Fungal Genetics and Biology*, vol. 23, pp. 18-33 (1998).

METHOD FOR THE PRODUCTION OF DRY FREE-FLOWING HYDROPHOBIN PREPARATIONS

RELATED APPLICATIONS

This application is a national stage application (under 35 U.S.C. §371) of PCT/EP2007/058103, filed Aug. 6, 2007, which claims benefit of European Application No. 06118947.8, filed Aug. 15, 2006.

The invention relates to an improved method for the production of dry, free-flowing, stable hydrophobin preparations by spraying an aqueous hydrophobin solution in a spraying device. It further relates to hydrophobin preparations produced by this method which comprise these hydrophobin preparations.

The isolation of hydrophobins usually occurs as aqueous solution. In this form, the hydrophobins lose their activity or are microbially decomposed and can only be stored and transported with great expenditure. It is therefore desirable to produce dry preparations of hydrophobins which comprise the hydrophobin in concentrated form with the lowest possible loss of its specific effect. Furthermore, these preparations should consist of particles with well developed surface in a particle size of from 50 to 600 µm, so that, in the further-processing industry, a homogeneous mixture of these products with other substances or a good applicability is ensured.

There are various spray methods for removing water from enzyme-containing aqueous media.

In the U.S. Pat. No. 4,617,272, enzyme-containing media are sprayed onto inert particles heated in a fluidized bed. Polyolefins, polycarbonates, polymethyl methacrylates or polystyrene are specified as suitable inert particles.

One disadvantage of this method is that the dry enzyme powders produced by means of these inert particles cannot be used in the food and animal feed industry.

According to another method, which is described in the Economic Patent DD 263 790, milk curdling protease products are produced by spraying aqueous protease solutions onto carrier substances located in a fluidized-bed granulator. Skimmed milk powder and/or dextrin-containing substances are described as carrier substances.

Although the resulting products have good enzyme stability and pourability and the carrier substances used are physiologically compatible, this method has the disadvantage that up to 10 times the amount of carrier substances, based on enzyme solid, has to be used.

EP 522269 describes a method for the production of dry, free-flowing, stable enzyme preparations by spraying aqueous enzyme solutions, if appropriate comprising additives, in a spray device, wherein the enzyme solution is sprayed with co-use of from 5 to 60% by weight, based on the enzyme solids content of the solution, of a spray auxiliary consisting of hydrophobic silica and/or a metal salt of a higher fatty acid at 0 to 50° C., and the particles laden with spray auxiliaries obtained in this way are dried.

It was therefore an object of the present invention to propose a method which allows aqueous hydrophobin solutions to be converted into dry, stable hydrophobin preparations which can be used in the further-processing industry.

It has now been found that the method defined at the start leads to particularly highly suitable hydrophobin preparations when the aqueous hydrophobin solution, if appropriate comprising additives, is sprayed with co-use of from 5 to 200% by weight, based on the hydrophobin solids content of the solution, of a spray auxiliary consisting of one or more sugar alcohols, and the particles laden with spray auxiliaries obtained in this way are dried.

Hydrophobins are small proteins of about 100 AA which are characteristic of filamentous fungi and do not occur in other organisms. Recently, hydrophobin-like proteins were discovered in *Streptomyces coelicolor*, which are referred to as "chaplins" and likewise have high surface-active properties. At water/air interfaces, chaplins can assemble to give amyloid-like fibrils (Classen et al. 2003 Genes Dev 1714-1726; Elliot et al. 2003, Genes Dev. 17, 1727-1740).

Hydrophobins are distributed in a water-insoluble form on the surface of various fungal structures, such as, for example, aerial hyphae, spores, fruiting bodies. The genes for hydrophobins were able to be isolated from ascomycetes, deuteromycetes and basidiomycetes. Some fungi comprise more than one hydrophobin gene, e.g. *Schizophyllum commune, Coprinus cinereus, Aspergillus nidulans*. Different hydrophobins are evidently involved in different stages of fungal development. The hydrophobins here are presumably responsible for different functions (van Wetter et al., 2000, Mol. Microbiol., 36, 201-210; Kershaw et al. 1998, Fungal Genet. Biol, 1998, 23, 18-33).

DESCRIPTION OF THE INVENTION

Figure 1:
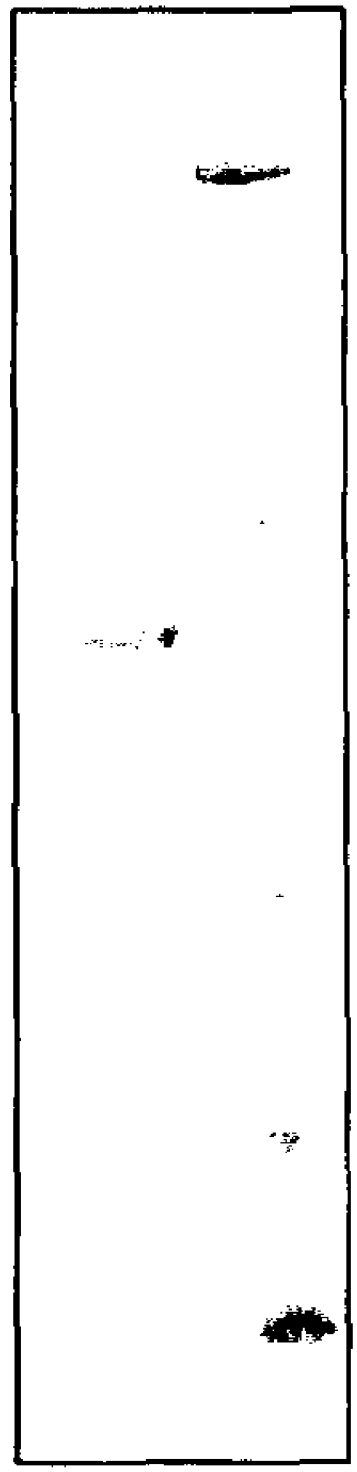
FIG. 1: protein gel Example 1.

Particularly highly suitable hydrophobins for the method according to the invention are polypeptides of the general structural formula (I)

$$X_n-C^1-X_{1-50}-C^2-X_{0-5}-C^3-X_p-C^4-X_{1-100}-C^5-X_{1-50}-C^6-X_{0-5}-C^7-X_{1-50}-C^8-X_m \quad (I)$$

where X can be any of the 20 naturally occurring amino acids (Phe, Leu, Ser, Tyr, Cys, Trp, Pro, His, Gln, Arg, Ile Met, Thr, Asn, Lys, Val, Ala, Asp, Glu, Gly) and the indices alongside X represent the number of amino acids, where the indices n and m are numbers between 0 and 500, preferably between 15 and 300, p is a number between 1 and 250, preferably 1-100, and C is cysteine, alanine, serine, glycine, methionine or threonine, where at least four of the radicals designated C are cysteine, with the proviso that at least one of the peptide sequences abbreviated to $X_n$ or $X_m$ or $X_p$ is a peptide sequence at least 20 amino acids in length, which is naturally not linked to a hydrophobin, which, after coating a glass surface, effect a change in the contact angle of at least 20°.

The amino acids designated $C^1$ to $C^8$ are preferably cysteines; however, they can also be replaced by other amino acids of similar spatial filling, preferably by alanine, serine, threonine, methionine or glycine. However, at least four, preferably at least 5, particularly preferably at least 6 and in particular at least 7, of the positions $C^1$ to $C^8$ should consist of cysteines. Cysteines can either be present in reduced form in the proteins according to the invention, or form disulfide bridges with one another. Particular preference is given to the intramolecular formation of C—C bridges, in particular those with at least one, preferably 2, particularly preferably 3 and very particularly preferably 4, intramolecular disulfide bridges. In the case of the above-described exchange of cysteines for amino acids of similar spatial filling, those C positions are advantageously exchanged in pairs which can form intramolecular disulfide bridges with one another.

If, in the positions referred to as X, cysteines, serines, alanines, glycines, methionines or threonines are also used, the numbering of the individual C positions in the general formulae can change accordingly.

Particularly advantageous polypeptides are those of the general formula (II)

$$X_n-C^1-X_{3-25}-C^2-X_{0-2}-C^3-X_{5-50}-C^4-X_{2-35}-C^5-X_{2-15}-C^6-X_{0-2}-C^7-X_{3-35}-C^8-X_m \quad (II)$$

where X can be any of the 20 naturally occurring amino acids (Phe, Leu, Ser, Tyr, Cys, Trp, Pro, His, Gln, Arg, Ile Met, Thr, Asn, Lys, Val, Ala, Asp, Glu, Gly) and the indices alongside X represent the number of amino acids, where the indices n and m are numbers between 2 and 300 and C is cysteine, alanine, serine, glycine, methionine or threonine, where at least four of the radicals designated C are cysteine, with the proviso that at least one of the peptide sequences abbreviated to $X_n$ or $X_m$ is a peptide sequence which is at least 35 amino acids in length, which is naturally not linked to a hydrophobin, which, after coating a glass surface, effect a change in the contact angle of at least 20°.

The origin of the hydrophobins plays no role here. For example, the hydrophobins can have been isolated, for example, from microorganisms such as, for example bacteria, yeasts and fungi. Particularly hydrophobins which have been obtained by means of genetically modified organisms are suitable according to the invention.

Suitable additives which can be added to the aqueous hydrophobin solution are customary, preferably physiologically acceptable materials.

These include polysaccharides, such as cellulose compounds, pectins and starches of varying origin, film-forming colloids, such as gelatin, casein or albumin, mono- or disaccharides, such as glucose, fructose, lactose or sucrose, or vegetable products, such as, for example, wheat grit bran or soybean flour.

Furthermore, additives which can be used are inorganic materials, such as calcium carbonate, clay earths, various forms of precipitated or mineral silicas and silicates, but also products of animal origin, such as, for example, eggshell flour. Moreover, further additives such as emulsifiers, antioxidants or preservatives can also be used.

The amount of additives used is usually 5 to 200% by weight, preferably 20 to 200% by weight, based on hydrophobin solid.

The method according to the invention can be carried out as follows:

The spray auxiliary is introduced together with air or an inert gas by spraying into a spray device, preferably a spray tower. The introduction of the spray auxiliary expediently takes place above the atomization unit. Suitable spray towers are all configurations known to the person skilled in the art (see e.g. K. Masters, Spray Drying Handbook, ISBN 0-582-06266-7).

The aqueous hydrophobin solution can be introduced under pressure through nozzles into the spray space laden with spray auxiliary. However, it is also possible to allow the aqueous hydrophobin solution to flow onto rapidly rotating atomizing discs. The design of the atomization unit has no decisive influence on the product. Further atomization devices known to the person skilled in the art can also be used (see e.g. Arthur H. Levebvre, Atomization and Sprays, ISBN 0-89116-603-3).

The spray cone which forms comprises a large number of small droplets which are then converted to a dry hydrophobin preparation by withdrawing water. The drying expediently takes place immediately after the spraying. Of suitability for this purpose is evaporative drying, during which the water is removed from the droplets with the help of a preheated stream of air or inert gas.

For the drying, particular preference is given to using a fluidized bed which is located below the atomization unit or in the region of the atomization unit. The fluidized bed can either be operated as an integral part of a spray tower (e.g. FSD Technology from Niro or SBD Technology from Anhydro), or a drying technology is used which is known to the person skilled in the art as fluidized-bed spray granulation and is explained, for example, by Hans Uhlemann and Lothar Mörl in the book "Wirbelschicht-Sprühgranulation [Fluidized-bed spray granulation]", ISBN 3-540-66985-x.

For particularly oxidation-sensitive hydrophobins, the use of inert gas, such as, for example, nitrogen, during the spraying and the drying is preferred.

The hydrophobin preparations prepared using this method are characterized by their good stability and by their low residual moisture content. The residual moisture is less than 10%, based on solid substance, measured by Karl-Fischer tritration, preferably, it is less than 7%, particular preference being given to residual moisture contents of less than 5%.

The average particle size, measured by means of laser diffraction, is in the range from 10 micrometers to 3 mm, preference being given to average particle sizes in the range from 100 micrometers to 1 mm. In particular, the fraction of particles with a size of less than 50 micrometers should be restricted since this fine fraction has a tendency toward undesired dust formation during handling. Particular preference is given to solids with a fraction of particles measuring less than 50 micrometers of less than 5 mass %.

The bulk-density of the dry hydrophobin preparation is in the range from 50 to 1200 kg/m$^3$. For spray-drying methods in the spray tower, bulk densities of from 80 to 400 kg/m$^3$ are preferred, particularly preferably from 100 to 300 kg/m$^3$. During the fluidized-bed spray granulation, bulk densities of from 500 to 1000 kg/m$^3$ are preferred, particularly preferably from 600 to 800 kg/m$^3$.

The temperature of the solution to be atomized should usually be 0 to 150° C. In the case of hydrophobins which are easily inactivated by heat, preference is given to using temperatures of 0-80° C., and in the case of heat-stable hydrophobins, a temperature of from 20 to 100° C. is preferably used.

Suitable spray auxiliaries are sugar alcohols. Particularly suitable sugar alcohols are sorbitol, mannitol and inositol. Furthermore, cellulose, starch, and corn starch are suitable as drying auxiliary.

The weight amount of spray auxiliary is 5 to 200% by weight, preferably 20 to 200% by weight, and particularly preferably 70 to 130% by weight, based on hydrophobin solid.

The direct introduction of the spray auxiliary into the spray zone largely avoids the mechanical stressing of the particles which results, for example, from a carrier-filled, fluidized bed.

The hydrophobin preparations according to the invention can also be prepared successfully without using spray auxiliaries.

The novel method is described in detail in the examples below.

General

| Names | |
|---|---|
| Hydrophobin A: | YaaD-DewA-His6 |
| Hydrophobin B: | 40 AA YaaD-DewA-His6 |
| Dry substance content: | DS [% by wt.] |

Activity Test

To assess the protein activity, the coating properties of the redissolved spray-dried or spray-granulated hydrophobin fusion protein are used. The evaluation of the coating properties is preferably undertaken on glass or Teflon as models for hydrophilic or hydrophobic surfaces, respectively.

Standard Experiments for Coating

Glass:
    concentration of hydrophobin: 50 mg/l
    incubation of glass plates overnight (temperature: 80° C.) in 10 mM Tris pH 8
    after coating, washing in demin. water
    then incubation 10 min/80° C./1% SDS
    washing in demin. water Teflon:
    concentration: 50 mg/l
    incubation of Teflon plates overnight (temperature: 80° C.) in 10 mM Tris pH 8
    after coating, washing in demin. water
    incubation 10 min/80° C./0.1% Tween 20
    washing in demin. water
    then incubation 10 min/80° C./1% SDS
    washing in demin. water The samples were dried in the air and the contact angle (in degrees) of a drop of 5 µl of water was determined. The following values, for example, were produced:

Mixture with -YaaD-DewA fusion protein (control: without protein; -:YaaD-DewA-His$_6$ 100 mg/l of purified fusion partner):

| | After 1% SDS 80° C. | |
|---|---|---|
| | Teflon | Glass |
| Control | 96.8 | 30 |
| YaaD | 97.4 | 38.7 |
| 50 mg/l | 85.9 | 77.9 |

Fermentation and Work-Up

In a 1000 ml Erlenmeyer flask with two side chicanes, 200 ml of complex medium are inoculated with an *E. coli* strain expressing YaaD-DewA-His6 or 40 AA YaaD-DewA-H is 6 from LB-Amp plate (100 µg/ml ampicillin) (=first preculture). The strain is incubated up to an $OD_{600\,nm}$ of ca. 3.5 at 37° C. on a shaker with $d_o$=2.5 cm at 200 rpm. Afterwards 4 further 1000 ml Erlenmeyer flasks with chicanes (in each case with 200 ml of complex medium) are each inoculated with 1 ml of the first preculture and incubated at 37° C. in the shaking cabinet ($d_o$=2.5 cm, n=200 rpm) (=preculture). As soon as the $OD_{600\,nm}$ is >6, the prefermenter filled with complex medium is inoculated from this second shake culture. After reaching an $OD_{600\,nm}$ of >9 or OTR=80 mmol/(l·h), the main fermenter is inoculated. The main culture is run in the fed-batch method in mineral medium with very small amounts of complex constituents. At an $OD_{600\,nm}$ of >70, the cells are induced with 50 µm of IPTG. After an induction time of between 4 and 20 h, the fermentation is terminated and the vessel contents are cooled to 4° C. After the fermentation, the cells are separated off from the fermentation broth, for example by means of a plate separator (e.g. nozzle separator) or by microfiltration, and resuspended in demin. water. Following separation once more by using a plate separator or a microfiltration, the again resuspended cells are disrupted using a high-pressure homogenizer at a differential pressure of 2000 bar. The homogenizate is separated off using a plate separator (e.g. nozzle separator) and washed several times. The resulting concentrate is adjusted to pH 12.5. After ca. 15 min, the pH is lowered to 9. The neutralized hydrophobin-containing solution is run over a tubular centrifuge to separate off solids. According to SDS-PAGE analyses, the hydrophobin is present in the supernatant after the final centrifugation. This supernatant is referred to below as "aqueous hydrophobin solution". The dry substance content of the aqueous hydrophobin solution is usually 2-4% by weight. The hydrophobin concentration determined by means of ELISA is at this stage typically in the range 4-35 g/l.

Example 1

28.6 kg of mannitol are stirred into 866 kg of aqueous hydrophobin A solution with a solids content of 3.4% by weight. The solution is sprayed co-currently into 1200 kg/h of nitrogen using a Gerig Gr.0 type twin-material nozzle at a spraying rate of 41 kg/h. The spray tower has a diameter of 800 mm and a height of 12 m. The inlet temperature of the drying gas here is 161 degrees. The exit temperature of the drying gas is 80 degrees. The deposition takes place in the filter, in which 31.7 kg of dry material are retrieved. 6.1 kg of dry material are swept out of the tower. The contact angles of the redissolved hydrophobin-containing dry material resulting from the activity test are listed in Table 1. The protein gel of the redissolved dry material is shown in FIG. 1.

Example 2

2.4 kg of mannitol are stirred into 109 kg of aqueous hydrophobin B solution with a solids content of 2.4% by weight and a hydrophobin concentration of 4.5 g/l. The solution is sprayed co-currently into 450 kg/h of nitrogen using a 3 mm Niro twin-material nozzle at a spraying rate of 12.8 kg/h. The spray tower (manufacturer Niro) has a diameter of 1200 mm and a cylindrical height of 2650 mm. The height of the conical section is 600 mm. The inlet temperature of the drying gas is 163 degrees. The outlet temperature of the drying gas is 79 degrees. 4.1 kg of dry material are retrieved in the cyclone discharge. In the downstream filter discharge, 0.73 kg of dry material are retrieved. The contact angles of the redissolved hydrophobin-containing dry material resulting from the activity test are listed in Table 2. The protein gel of the redissolved dry material is shown in FIG. 2.

Example 3

5.4 kg of sodium sulfate are stirred into 155 kg of aqueous hydrophobin A solution with a solids content of 3.4% by weight and a hydrophobin content of 31 g/l. The solution is sprayed co-currently into 450 kg/h of nitrogen at a spraying rate of 12.2 kg/h via a 3 mm Niro twin-material nozzle. The spray tower (manufacturer NIRO) has a diameter of 1200 mm and a cylindrical height of 2650 mm. The height of the conical section is 600 mm. The inlet temperature of the drying gas here is 165 degrees. The outlet temperature of the drying gas is 84 degrees. In the cyclone discharge, 5.5 kg of dry material are retrieved.

Example 4

40 g of sodium sulfate are stirred into 2 l of aqueous hydrophobin B solution with a dry substance content of 20 g/l. The solution is dried, in a Büchi laboratory spray-dryer with nitrogen as drying gas. The gas inlet temperature is 160 degrees. The gas outlet temperature is 80° C. In the cyclone discharge, 40 g are retrieved. The resulting contact angles of the redissolved dry material are listed in Table 3.

Example 5

40 g of maltodextrin are stirred into 2 l of aqueous hydrophobin B solution with a dry substance content of 20 g/l. The solution is dried in a Büchi laboratory spray-dryer with nitrogen as drying gas. The gas inlet temperature is 160 degrees. The gas outlet temperature is 80° C. In the cyclone discharge, 39 g are retrieved. The resulting contact angles of the redissolved dry material are listed in Table 4.

Example 6

Figure 3:
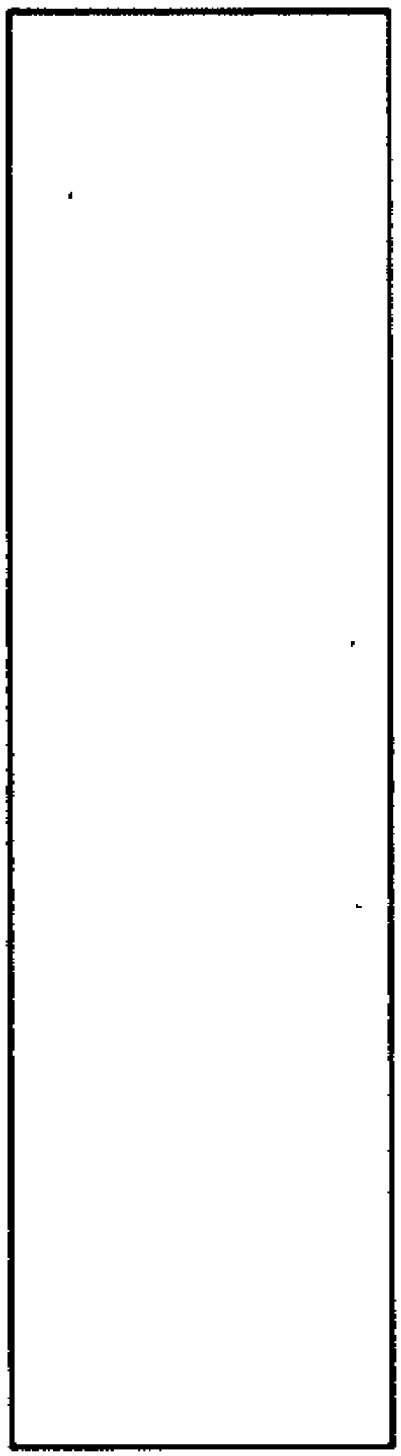
FIG. 3: protein gel Example 6.

240 kg of aqueous hydrophobin A solution (TS=3.4% by weight, hydrophobin concentration 31 g/l) are concentrated. This results in 65 kg of aqueous hydrophobin A solution with a solids content of 13% by weight and a hydrophobin content of 117 g/l. This concentrated solution is sprayed into 450 kg/h of nitrogen at a spraying rate of 13.7 kg/h via a 3 mm Niro twin-material nozzle. The spray tower (manufacturer NIRO) has a diameter of 1200 mm and a cylindrical height of 2650 mm. The height of the conical section is 600 mm. The inlet temperature of the drying gas here is 165 degrees. The outlet temperature of the drying gas is 84 degrees. In the cyclone discharge, 6.1 kg of dry material are retrieved. The contact angles of the redissolved hydrophobin-containing dry material resulting from the activity test are listed in Table 5. The protein gel of the redissolved dry material is shown in FIG. 3.

Example 7

Figure 4:
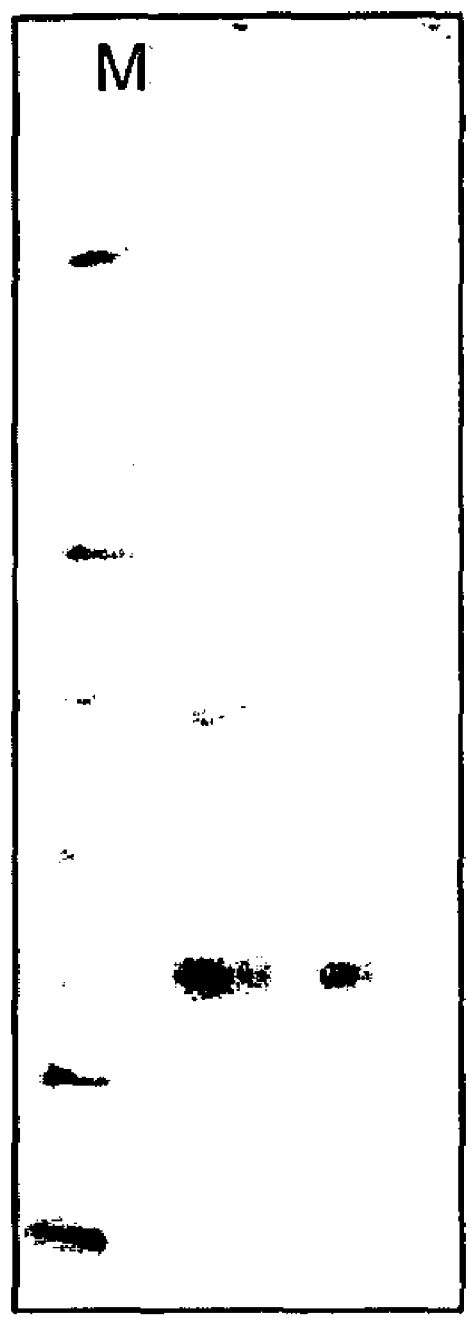
FIG. 4: protein gel Example 7.

894 kg of aqueous hydrophobin B solution (TS=2.4% by weight, hydrophobin concentration 6.3 g/l) are concentrated. This results in 226 kg of concentrated aqueous hydrophobin B solution (TS=9.7% by weight, hydrophobin concentration 35.4 g/l). 75 kg of this concentrated aqueous hydrophobin B solution with a solids content of 9.6% (hydrophobin content ca. 35.4 g/l) is sprayed co-currently into 450 kg/h of nitrogen at a temperature of 25 degrees using a single-material nozzle (Niro) with a diameter of 2 mm at a spraying rate of 13.6 kg/h. The spray tower (manufacturer NIRO) has a diameter of 1200 mm and a cylindrical height of 2650 mm. The height of the conical section is 600 mm. The inlet temperature of the drying gas here is 168 degrees. The exit temperature of the drying gas is 84 degrees. In the cyclone, 5 kg of product were retrieved, and in the filter 1.2 kg of product were retrieved. The spray-dried material has a bulk density of 100 kg/m$^3$. The purity of the resulting material, which is defined as a percentage of hydrophobin to total protein concentration, is 45%. The contact angles of the redissolved hydrophobin-containing dry material resulting from the activity test are listed in Table 6. The protein gel of the redissolved dry material is shown in FIG. 4.

Example 8

921 kg of aqueous hydrophobin A solution (TS=2.3% by weight, hydrophobin concentration of 18 g/l) are concentrated. This results in 241 kg of concentrated aqueous hydrophobin A solution (TS=9.6% by weight, hydrophobin concentration 98.3 g/l). This concentrated aqueous hydrophobin A solution is introduced into a spray fluidized bed (d=150 mm, A=0.177 m$^2$) with initial charge of dried hydrophobin A. The spraying of the concentrated aqueous hydrophobin A solution takes place via a 2-material nozzle with a diameter of 2 mm.

Part 1: 2 kg of hydrophobin A from Example 4 are initially introduced. The spraying rate of the concentrated aqueous hydrophobin A solution (=feed 1) is increased in the steps 1.8 kg/h; 2.5 kg/h; 3.3 kg/h. The gas inlet temperature at a product spraying rate of 3.3 kg/h is 138 degrees and the associated drying gas stream (air) is 75 m$^3$/h. The average product outlet temperature in the lower region of the spray fluidized bed is 69 degrees. The granules are continuously discharged via a discharge screw. The particle size is controlled via the screening of the discharge and appropriate grinding of the coarse material in a grain cutter. From 5.9 kg of feed 1, 0.44 kg of dry material result (sample 1, FIG. 5).

Part 2: concentrated aqueous hydrophobin A solution (=feed 2) is sprayed onto the dry material remaining in the fluidized bed from part 1 (1.5 kg, particle size of the initial charge <1.25 mm) at a spraying rate of 3.2 kg/h. The average gas inlet temperature is 126 degrees and the associated stream of drying gas (air) is 102 m$^3$/h. The average product outlet temperature in the lower region of the spray fluidized bed is 67 degrees. The granules are continuously discharged via a discharge screw. The particle size is controlled via the screening of the discharge and appropriate grinding of the coarse material in a grain cutter. From 21.3 kg of feed 2, 1.6 kg of dry material result (sample 2, FIG. 5).

Part 3: concentrated aqueous hydrophobin A solution (=feed 3) is sprayed onto the dry material remaining in the fluidized bed from part 2 (1.3 kg) at a spraying rate of 3.6 kg/h. The average gas inlet temperature is 143 degrees and the associated stream of drying gas (air) is 102 m$^3$/h. The average product outlet temperature in the lower region of the spray fluidized bed is 67 degrees. The granules are discharged continuously via a discharge screw. The particle size is controlled via the screening of the discharge and appropriate grinding of the coarse material in a grain cutter. From 21.6 kg of feed 3, 1.6 kg of dry material result (sample 3, FIG. 5).

Part 4: concentrated aqueous hydrophobin A solution (=feed 4) is sprayed onto the dry material from part 3 remaining in the fluidized bed (1.9 kg, particle size of the initial charge <1.6 mm) at a spraying rate of 4.1 kg/h. The average gas inlet temperature is 147 degrees and the associated stream of drying gas (air) is 100 m$^3$/h. The average product outlet temperature in the lower region of the spray fluidized bed is 66 degrees. The granules are continuously discharged via a discharge screw. The particle size is controlled via the screening of the discharge and appropriate grinding of the coarse material in a grain cutter. From 24.6 kg of feed 4, 1.9 kg of dry material result (sample 4, FIG. 5).

Part 5: concentrated aqueous hydrophobin A solution (=feed 5) is sprayed onto the dry material from part 4 remaining in the fluidized bed (1.3 kg, particle size of the initial charge <1.4 mm) at a spray rate of 4 kg/h. The average gas inlet temperature is 146 degrees and the associated stream of drying gas (air) is 99 m³/h. The average product outlet temperature in the lower region of the spray fluidized bed is 67 degrees. The granules are continuously discharged via a discharge screw. The particle size is controlled via the screening of the discharge and appropriate grinding of the coarse material in a grain cutter. From 23 kg of feed 5, 1.7 kg of dry material result (sample 5, FIG. 5).

Part 6: concentrated aqueous hydrophobin A solution (=feed 6) is sprayed onto the dry material from part 5 remaining in the fluidized bed (1.1 kg, particle size of the initial charge <1.25 mm) at a spraying rate of 3.5 kg/h. The average gas inlet temperature is 142 degrees and the associated stream of drying gas (air) is 101 m³/h. The average product outlet temperature in the lower region of the spray fluidized bed is 71 degrees. The granules are continuously discharged via a discharge screw. The particle size is controlled via the screening of the discharge and appropriate grinding of the coarse material in a grain cutter. From 26.8 kg of feed 6, 2 kg of dry material result (sample 6, FIG. 5). The bulk density of the useful fraction is 0.65 kg/l.

Part 7: concentrated aqueous hydrophobin A solution (=feed 7) is sprayed onto the dry material from part 6 remaining in the fluidized bed (1.2 kg, particle size of the initial charge <1.25 mm) at a spraying rate of 3.7 kg/h. The average gas inlet temperature is 141 degrees and the associated stream of drying gas (air) is 99 m³/h. The average product outlet temperature in the lower region of the spray fluidized bed is 72 degrees. The granules are continuously discharged via a discharge screw. The particle size is controlled via the screening of the discharge and appropriate grinding of the coarse material in a grain cutter. From 22.7 kg of feed 7, 1.7 kg of dry material result (sample 7, FIG. 5). The bulk density of the useful fraction is 0.65 kg/l. The fraction between 0.2-0.72 mm particle size is 98.9%.

Besides using the grain cutter in this example, a roller mill or a grinder or the like is suitable for grinding the coarse material.

Figure 5:
FIG. 5: protein gel Example 8.

The contact angles of the redissolved hydrophobin-containing dry material resulting from the activity test are listed in Tab. 7. The protein gel of the redissolved dry material is shown in FIG. 5.

Example 9

894 kg of aqueous hydrophobin B solution (DS=2.4% by weight, hydrophobin concentration 6.3 g/l) are concentrated. 226 kg of concentrated aqueous hydrophobin B solution result (DS=9.7% by weight, hydrophobin concentration 35.4 g/l).

Part 1: 1 kg of the hydrophobin B-containing dry material from a spray drying analogous to Example 5 is initially introduced. The gas inlet temperature is 141 degrees and the associated stream of drying gas (air) is 49 m³/h. The average product outlet temperature in the lower region of the spray fluidized bed is 69 degrees. The granules are continuously discharged via a discharge screw. The particle size is controlled via the screening of the discharge and appropriate grinding of the coarse material in a grain cutter. From 5 kg of feed 1, 0.46 kg of dry material result.

Part 2: concentrated aqueous hydrophobin B solution (=feed 2) is sprayed onto the dry material from part 1 remaining in the fluidized bed (0.87 kg; particle size <0.8 mm) at a spraying rate of 3.8 kg/h. The gas inlet temperature is 139 degrees and the associated stream of drying gas (air) is 99 m³/h. The average product outlet temperature in the lower region of the spray fluidized bed is 67 degrees. The granules are continuously discharged via a discharge screw. The particle size is controlled via the screening of the discharge and appropriate grinding of the coarse material in a grain cutter. From 22.8 kg of feed 2, 2.1 kg of dry material result. The fraction <0.4 mm is ca. 80%.

Part 3: concentrated aqueous hydrophobin B solution (=feed 3) is sprayed onto the dry material from part 2 remaining in the fluidized bed (0.87 kg, particle size <0.8 mm) at a spraying rate of 3.8 kg/h. The gas inlet temperature is 140 degrees and the associated stream of drying gas (air) is 102 m³/h. The average product outlet temperature in the lower region of the spray fluidized bed is 69 degrees. The granules are continuously discharged via a discharge screw. The particle size is controlled via the screening of the discharge and appropriate grinding of the coarse material in a grain cutter. From 30.1 kg of feed 3, 2.78 kg of dry material result. The fraction between 0.4-0.8 mm is 80%.

Part 4: concentrated aqueous hydrophobin B solution (=feed 4) is sprayed onto the dry material from part 3 remaining in the fluidized bed (1.1 kg, particle size <0.8 mm) at a spraying rate of 3.5 kg/h. The gas inlet temperature is 142 degrees and the associated stream of drying gas (air) is 96 m³/h. The average product outlet temperature in the lower region of the spray fluidized bed is 72 degrees. The granules are continuously discharged via a discharge screw. The particle size is controlled via the screening of the discharge and corresponding grinding of the coarse material in a grain cutter. From 25.9 kg of feed 4, 2.4 kg of dry material result. The fraction from 0.4-0.8 mm comprises ca. 80%.

Part 5: concentrated aqueous hydrophobin B solution (=feed 5) is sprayed onto the dry material from part 4 remaining in the fluidized bed (1.1 kg, particle size <0.8 mm) at a spraying rate of 3.4 kg/h. The gas inlet temperature is 139 degrees and the associated stream of drying gas (nitrogen) is 99 m³/h. The average product outlet temperature in the lower region of the spray fluidized bed is 72 degrees. From 26.6 kg of feed 5, 2.5 kg of dry material result. The granules are continuously discharged via a discharge screw. The particle size is controlled via the screening of the discharge and appropriate grinding of the coarse material in a grain cutter. The fraction from 0.2-0.8 mm comprises ca. 98%.

Part 6: concentrated aqueous hydrophobin B solution (=feed 6) is sprayed onto the dry material from part 5 remaining in the fluidized bed (1.1 kg, particle size <0.8 mm) at a spraying rate of 3.4 kg/h. The gas inlet temperature is 142 degrees and the associated stream of drying gas (nitrogen) is 98 m³/h. The average product outlet temperature in the lower region of the spray fluidized bed is 72 degrees. From 25.4 kg of feed 6, 2.4 kg of dry material result. The granules are continuously discharged via a discharge screw. The particle size is controlled via the screening of the discharge and appropriate grinding, of the coarse material in a grain cutter. The fraction from 0.2-0.8 mm comprises 91-95%. The bulk density of the sample is 0.57 kg/l.

Part 7: concentrated aqueous hydrophobin B solution (=feed 7) is sprayed onto the dry material from part 6 remaining in the fluidized bed (1.4 kg, particle size <0.8 mm) at a spraying rate of 3.4 kg/h. The gas inlet temperature is 140 degrees and the associated stream of drying gas (nitrogen) is 100 m³/h. The average product outlet temperature in the lower region of the spray fluidized bed is 72 degrees. The granules are continuously discharged via a discharge screw. The particle size is controlled via the screening of the discharge, and appropriate grinding of the coarse material in a grain cutter. From 18.4 kg of feed 7, 1.8 kg of dry material result. The fraction from 0.2-0.4 mm is >0.64 kg/l.

Figure 6:
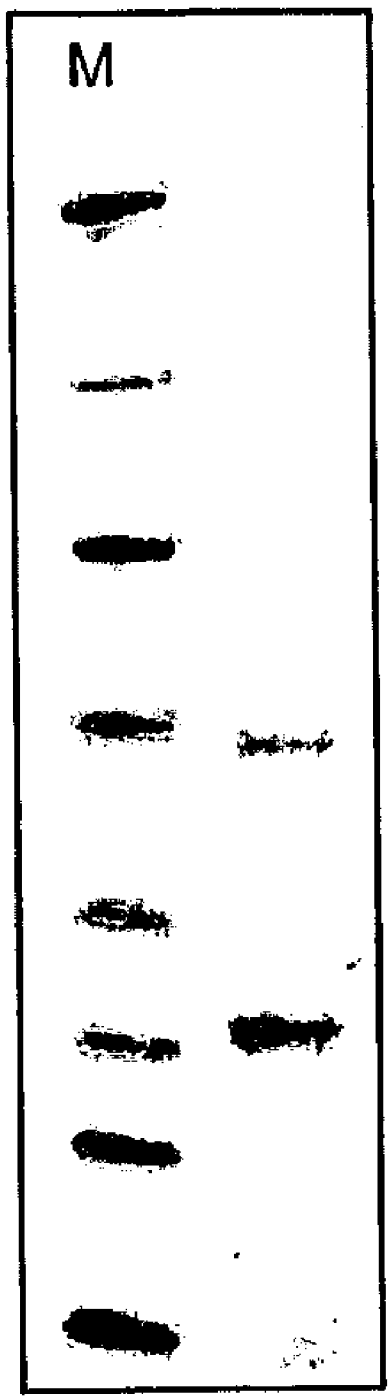
FIG. 6: protein gel Example 9.

Part 8: concentrated aqueous hydrophobin B solution (=feed 8) is sprayed onto the dry material from part 7 remaining in the fluidized bed (1.2 kg, particle size <0.8 mm) at a spraying rate between 3 and 2.5 kg/h. The gas inlet temperature is 120 degrees and the associated stream of drying gas (nitrogen) is 100 m$^3$/h. The average product outlet temperature in the lower region of the spray fluidized bed is 67 degrees. The granules are continuously discharged via a discharge screw. The particle size is controlled via the screening of the discharge and appropriate grinding of the coarse material in a grain cutter. From 21.5 kg of feed 8, 2.1 kg of dry material result (FIG. 6). The proportion of the fraction between 0.2-0.4 mm is >70.5%.

Part 9: concentrated aqueous hydrophobin B solution (=feed 3) is sprayed onto the dry material from part 8 remaining in the fluidized bed (1.2 kg, particle size <0.8 mm) at a spraying rate of 4.1-4.4 kg/h. The gas inlet temperature is 163 degrees and the associated stream of drying gas (nitrogen) is 97 m$^3$/h. The average product outlet temperature in the lower region of the spray fluidized bed is 77 degrees. The granules are continuously discharged via a discharge screw. The particle size is controlled via the screening of the discharge and appropriate grinding of the coarse material in a grain cutter. From 29.6 kg of feed 9, 2.8 kg of dry material result. The proportion of the fraction between 0.2-0.4 mm is 14.8%.

Part 10: 1.3 kg of the coarse material ground under part 9 are initially introduced together with the fines (particle size of the initial charge <0.8 mm). The spraying rate of the concentrated aqueous hydrophobin B solution (=feed 10) is varied between 4.9 and 5.1 kg/h. The gas inlet temperature is 181 degrees and the associated stream of drying gas (nitrogen) is 95 m$^3$/h. The average product outlet temperature in the lower region of the spray fluidized bed is 82 degrees. The granules are continuously discharged via a discharge screw. The particle size is controlled via the screening of the discharge and appropriate grinding of the coarse material in a grain cutter. From 43.1 kg of feed 10, 4.1 kg of dry material result (sample 10, FIG. 6). The proportion of the fraction between 0.2-0.4 mm is 12.6%.

The contact angles of the redissolved hydrophobin-containing dry material of the end sample (part 10) resulting from the activity test are listed in Table 8. The protein gel of the redissolved dry material is shown in FIG. 6.

TABLE 1

Contact angles after spray drying of hydrophobin A with mannitol.

|  | Glass | Teflon |
| --- | --- | --- |
| Control | 20.5 | 108.2 |
| Example 1 | 66.2 | 85.5 |

TABLE 2

Contact angles after spray drying of hydrophobin B with mannitol.

|  | Glass | Teflon |
| --- | --- | --- |
| Control | 21.1 | 108.6 |
| Example 2 | 68.3 | 78.2 |

TABLE 3

Contact angles after spray drying of hydrophobin A with sodium sulfate.

|  | Glass | Teflon |
| --- | --- | --- |
| Control | 15 | 110.8 |
| Example 4 | 64.9 | 86.3 |

TABLE 4

Contact angles after spray drying of hydrophobin A with maltodextrin.

|  | Glass | Teflon |
| --- | --- | --- |
| Control | 15 | 110.8 |
| Example 5 | 65.7 | 85.7 |

TABLE 5

Contact angles after spray drying of hydrophobin A without auxiliary.

|  | Glass | Teflon |
| --- | --- | --- |
| Control | 15.5 | 107 |
| Example 6 | 65.9 | 85.6 |

TABLE 6

Contact angles after spray drying of hydrophobin B without auxiliary.

|  | Glass | Teflon |
| --- | --- | --- |
| Control | 32.8 | 96.2 |
| Example 7 | 69.6 | 74.8 |

TABLE 7

Contact angles after spray granulation of hydrophobin A without auxiliary.

| Example 8 | Glass | Teflon |
| --- | --- | --- |
| Control | 13 | 97.8 |
| Part 1 | 60.7 | 75.9 |
| Part 2 | 62.2 | 81.2 |
| Part 3 | 60.5 | 81.9 |
| Part 4 | 60.9 | 62.5 |
| Part 5 | 58.9 | 70.1 |
| Part 6 | 60 | 72.5 |
| Part 7 | 59.3 | 72.9 |

TABLE 8

Contact angles after spray granulation of hydrophobin B without auxiliary.

|  | Glass | Teflon |
| --- | --- | --- |
| Control | 23.3 | 100.8 |
| Example 9, end sample, Part 10 | 72.1 | 69.7 |

EXPLANATION OF THE FIGURES

Figure 2:
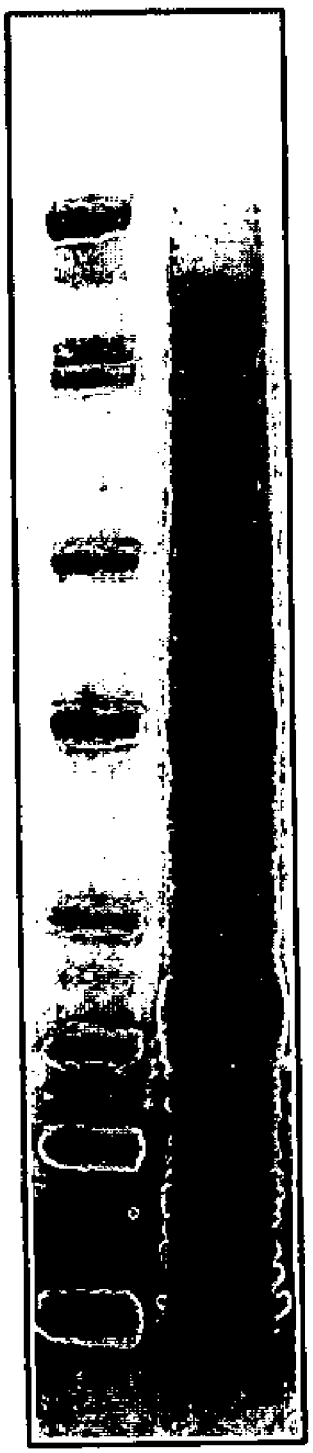
FIG. 2: protein gel Example 2.

FIG. 1: protein gel Example 1:
4-12% Bis-Tris gel/MES buffer, left: after spray drying of hydrophobin A with mannitol, right: marker: prestained SDS-Page standards, application/slot: 15 µg Pr, FIG. 2: protein gel Example 2:

FIG. 3: protein gel Example 6:
4-12% Bis-Tris gel/MES buffer, left: marker: prestained SDS-Page standards, application/slot: 15 µg Pr, right: after spray drying of hydrophobin A without auxiliary.

FIG. 4: protein gel Example 7:
4-12% Bis-Tris gel/MES buffer, left: marker: prestained SDS-Page standards, application/slot: 15 µg Pr, center/right: after spray drying of hydrophobin B without auxiliary.

FIG. 5: protein gel Example 8:
4-12% Bis-Tris gel/MES buffer, left: marker: prestained SDS-Page standards, application/slot: 15 µg Pr, remainder: parDS 1-7 after spray granulation of hydrophobin A without auxiliary.

FIG. 6: protein gel Example 9:
4-12% Bis-Tris gel/MES buffer, left: marker: prestained SDS-Page standards, application/slot: 15 µg Pr, right: sample 10 after spray granulation of hydrophobin B without auxiliary.

The invention claimed is:

1. A method for producing a dry, free-flowing, stable hydrophobin preparation comprising spraying and drying a hydrophobin solution and, optionally, an additive, in a spray device, wherein the spraying takes place at an inlet air temperature of 120° C. to 200° C.

2. The method of claim 1, wherein the hydrophobin solution is sprayed with co-use of from 5% to 200% by weight, based on the hydrophobin solids content of the solution, of an organic or inorganic spray auxiliary, wherein particles laden with the spray auxiliary are dried.

3. The method of claim 1, wherein the hydrophobin preparation is in the form of granules, and wherein a fluidized bed is used in addition to the spray device.

4. The method of claim 2, wherein the organic or inorganic spray auxiliary further comprises one or more sugar alcohols, celluloses, or starch.

5. The method of claim 2, wherein the organic or inorganic spray auxiliary comprises mannitol.

6. The method of claim 1, wherein the spraying takes place alternatively or additionally at an outlet air temperature of from 50° C. to 120° C.

* * * * *

UNITED STATES PATENT AND TRADEMARK OFFICE
CERTIFICATE OF CORRECTION

| | | |
|---|---|---|
| PATENT NO. | : 8,096,484 B2 | Page 1 of 1 |
| APPLICATION NO. | : 12/377479 | |
| DATED | : January 17, 2012 | |
| INVENTOR(S) | : Michael Schönherr et al. | |

It is certified that error appears in the above-identified patent and that said Letters Patent is hereby corrected as shown below:

On the Title Page: Item (75): Inventors:

"Tillman Faust, Weisenheim (DE)" should read -- Tillmann Faust, Weisenheim (DE) --

Signed and Sealed this
Third Day of April, 2012

David J. Kappos
*Director of the United States Patent and Trademark Office*